(12) United States Patent
Oki

(10) Patent No.: US 6,989,909 B2
(45) Date of Patent: *Jan. 24, 2006

(54) PRINT CONTROLLER, DRAWING CONTROLLER, DATA PROCESSING METHOD AND STORAGE MEDIUM

(75) Inventor: Joji Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

This patent is subject to a terminal disclaimer.

(21) Appl. No.: 09/885,054

(22) Filed: Jun. 21, 2001

(65) Prior Publication Data

US 2002/0051193 A1 May 2, 2002

(30) Foreign Application Priority Data

Jun. 23, 2000 (JP) .................................... 2000-189336

(51) Int. Cl.
*G06K 15/00* (2006.01)

(52) U.S. Cl. ..................................... 358/1.15; 358/1.18
(58) Field of Classification Search ................ 358/1.15, 358/1.18, 1.3, 1.13, 538, 540; 382/269, 270
See application file for complete search history.

(56) References Cited

U.S. PATENT DOCUMENTS 6,133,901 A * 10/2000 Law ........................... 345/611

2004/0198505 A1 * 10/2004 Hatakeda ..................... 472/57

FOREIGN PATENT DOCUMENTS

JP 7-074924 3/1995
JP 9-179703 7/1997

* cited by examiner

*Primary Examiner*—Arthur G. Evans
(74) *Attorney, Agent, or Firm*—Fitzpatrick, Cella, Harper & Scinto

(57) ABSTRACT

If a drawing section does not support the alpha blending drawing, or the bit depth of a first bitmap image is less than that of the alpha blending value, the alpha blending drawing is unavailable. To solve the problem even in such cases, a data processing method for a print controller and drawing controller, which is provided with a drawing section for executing drawing according to an input drawing command to a first bitmap image and a drawing process specifying section for performing alpha blending specification (transparency degree specification) for executing drawing according to an input object as a drawing command to the first bitmap image, includes an alpha value replacing section for replacing the alpha blending specification with area information corresponding to an alpha value and a drawing command converting section for converting the drawing command into another drawing command for performing a process corresponding to the area information.

13 Claims, 9 Drawing Sheets

DRAWING COMMAND 1
type=graphic (box)
x, y, w, h,
color=RGB (255, 0, 0),
rop=S
DRAWING COMMAND 2
type=graphic (box)
x+a, y+b, w', h',
color=RGB (255, 255, 0),
rop=S object 1
type=graphic (box)
x, y, w, h,
color=RGB (255, 0, 0),
rop=S
object 2
type=graphic (box)
x+a, y+b, w', h',
color=RGB (255, 255, 0),
rop=S

FIG. 5A
```
DRAWING COMMAND 1
type=graphic (box)
x, y, w, h,
color=RGB (255, 0, 0),
ROP=S
DRAWING COMMAND 2
type=graphic (box)
x+a, y+b, w', h',
color=RGB (255, 255, 0),
α =128
```
FIG. 5B
```
object 1
type=graphic (box)
x, y, w, h,
color=RGB (255, 0, 0),
rop=S
object 2
type=graphic (box)
x+a, y+b, w, h,
color=RGB (255, 255, 0),
pattern=w', h', patterndata
rop=DSPDxax
```
FIG. 5C
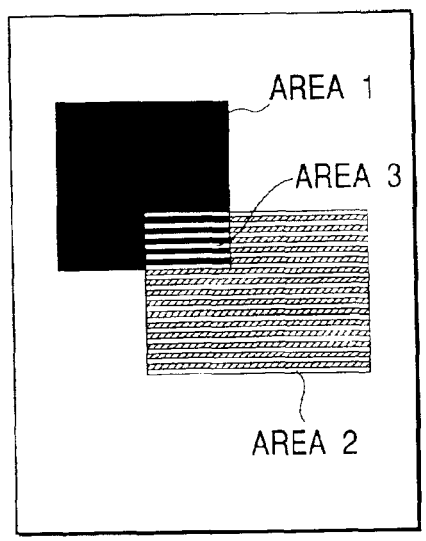
AREA 1
AREA 3
AREA 2
FIG. 5D
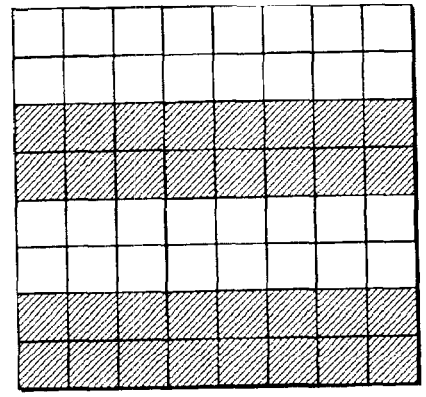

FIG. 6A

```
DRAWING COMMAND 1
type=graphic (box)
x, y, w, h,
color=RGB (255, 0, 0),
ROP=S
DRAWING COMMAND 2
type=image
x+a, y+b, w', h', matrix,
imagedata,
α=x, y, w, h, matrix, maskdata
```

FIG. 6B

```
object 1
type=graphic (box)
x, y, w, h,
color=RGB (255, 0, 0),
rop=S
object 2
type=image
x+a, y+b, w', h', matrix, imagedata
pattern=x+a, y+b, w', h', matrix,
patterndata
patterndither=w', h', ditherdata
rop=DSPDxax
```

FIG. 6C

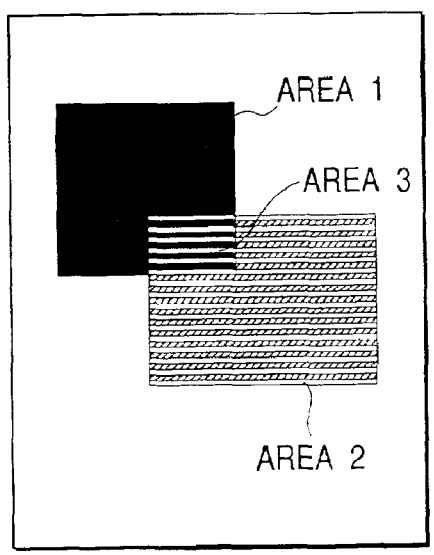

AREA 1
AREA 3
AREA 2

FIG. 6D

| 04 | 08 | 0a | 0f | 14 | 18 | 1a | 1f |
|---|---|---|---|---|---|---|---|
| 24 | 28 | 2a | 2f | 34 | 38 | 3a | 3f |
| 84 | 88 | 8a | 8f | 94 | 98 | 9a | 9f |
| a4 | a8 | aa | af | b4 | b8 | ba | bf |
| 44 | 48 | 4a | 4f | 54 | 58 | 5a | 5f |
| 64 | 68 | 6a | 6f | 74 | 78 | 7a | 7f |
| c4 | c8 | ca | cf | d4 | d8 | da | df |
| e4 | e8 | ea | ef | f4 | f8 | fa | ff |

FIG. 8A
```
DRAWING COMMAND 1
type=graphic (box)
x, y, w, h,
color=RGB (255, 0, 0),
ROP=S
DRAWING COMMAND 2
type=graphic (box)
x+a, y+b, w', h',
color=RGB (255, 255, 0),
α =128
```
FIG. 8B
```
object 1
type=graphic (box)
x, y, w, h,
color=RGB (255, 0, 0),
rop=S
object 2
type=graphic (box)
x+a, y+b, w', h',
color=RGB (255, 255, 0),
clip=clipobj
rop=S
```
FIG. 8C
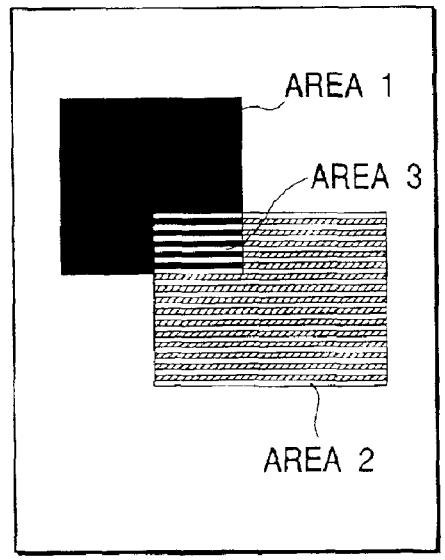
AREA 1
AREA 3
AREA 2
FIG. 8D
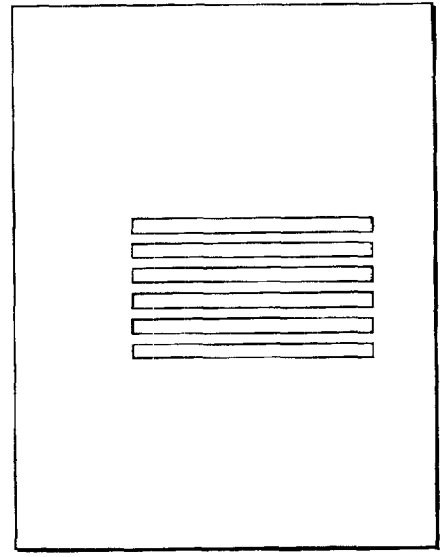

FIG. 9A
```
DRAWING COMMAND 1
type=graphic (box)
x, y, w, h,
color=RGB (255, 0, 0),
ROP=S
DRAWING COMMAND 2
type=graphic (box)
x, y, w, h,
color=RGB (255, 255, 0),
α =128
```
FIG. 9B
```
object 1
type=graphic (box)
x, y, w, h,
color=RGB (255, 0, 0),
rop=S
object 2
type=graphic (box)
x, y, w, h,
color=RGB (255, 255, 0),
rop=S
object 3
type=graphic (box)
x, y, w, h,
color=RGB (255, 255, 0),
rop=S
object 4
type=graphic (box)
x, y, w, h,
color=RGB (255, 255, 0),
rop=S
```
FIG. 9C
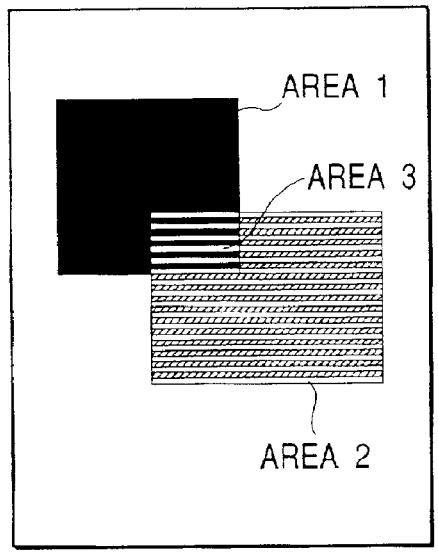
FIG. 9D
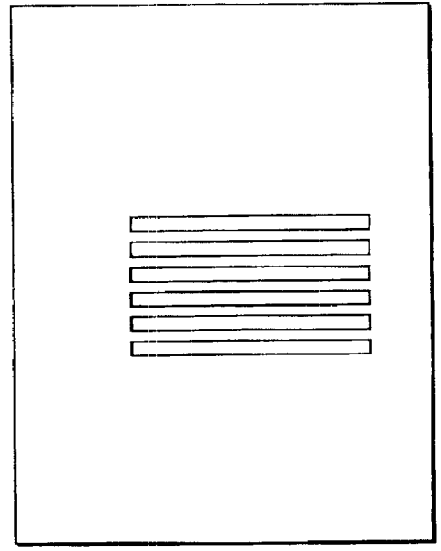

PRINT CONTROLLER, DRAWING CONTROLLER, DATA PROCESSING METHOD AND STORAGE MEDIUM

BACKGROUND OF THE INVENTION

1. Field of the Invention

The present invention relates to a print controller, drawing controller, data processing method and storage medium.

2. Related Background Art

In a conventional print controller and drawing controller having drawing means that executes drawing according to an input drawing command to a first bitmap image and drawing process specifying means that performs alpha blending specification (transparency degree specification) in executing drawing according to an input object as the drawing command to the first bitmap image, the drawing according to the input drawing command to the first bitmap image has been executed as follows.

A conventional example is shown in FIGS. 1A and 1B. FIG. 1A shows a first bitmap image before drawing is executed according to a relevant drawing command.

The first bitmap image is constituted by a bitmap image of RGB colors each having 8 bits per pixel, and a rectangle of RGB=(255, 0, 0) is drawn therein. A region where nothing is drawn has a value of RGB=(255, 255, 255).

FIG. 1B shows a result of drawing the rectangle of RGB colors=(255, 255, 0) each having 8 bits per pixel with a transparency degree specification of an alpha blending value=(128)=50% for 8 bits per pixel to FIG. 1A.

Since the area 1 has a value of RGB=(255, 0, 0), the area 2 has a value of RGB=(255, 255, 128) and the alpha blending value has a transparency degree specification of 50%, the area 3, which is an overlap of rectangles, has a value of RGB=(255, 128, 0).

Calculation in executing the drawing is performed according to the following equations:

$ResultR = (\alpha/255) \times SrcR + (1-(\alpha/255)) \times DestR;$ $ResultG = (\alpha/255) \times SrcG + (1-(\alpha/255)) \times DestG;$ and $ResultB = (\alpha/255) \times SrcB + (1-(\alpha/255)) \times DestB,$ where ResultR is a value of the first bitmap image after the drawing is executed, SrcR is a value of color of an input object, DestR is a value of the first bitmap image before the drawing is executed, and α is an alpha blending value of the input object.

However, if drawing means does not support the alpha blending drawing, the conventional print controller and drawing controller having drawing means that executes drawing according to an input drawing command to a first bitmap image and drawing process specifying means that performs alpha blending specification (transparency degree specification) in executing drawing according to an input object as the drawing command to the first bitmap image cannot provide expected results. In addition, if the bit depth of the first bitmap image is less than the bit depth of the alpha blending value, as in case of 1 bit per pixel for each of RGB colors, not 8 bits per pixel for each of RGB colors, expected results cannot be obtained.

SUMMARY OF THE INVENTION

The present invention has an object to provide a print controller, drawing controller, data processing method and storage medium capable of solving at least one of the above-described problems.

To achieve the above object, a print controller and drawing controller of the present invention, which have drawing means for executing drawing according to an input drawing command to a first bitmap image and drawing process specifying means for performing alpha blending specification (transparency degree specification) for executing drawing according to an input object as a drawing command to the first bitmap image, comprises: alpha value replacing means for replacing the alpha blending specification with area information corresponding to an alpha value; and drawing command converting means for converting the drawing command into another drawing command for performing a process corresponding to the area information.

The present invention relates to an image processing apparatus, image processing method and storage medium having new functions.

Other functions and features of the present invention will become apparent from the following description of the preferred embodiments together with the accompanying drawings.

BRIEF DESCRIPTION OF THE DRAWINGS

FIGS. 5A, 5B, 5C and 5D show a drawing command of the input data 218, intermediate data stored in the intermediate buffer 209, a drawing bitmap image generated by the renderer 210 and a pattern stored in the intermediate buffer 209, respectively;

FIGS. 6A, 6B, 6C and 6D show a drawing command of the input data 218, intermediate data stored in the intermediate buffer 209, a drawing bitmap image generated by the renderer 210 and dither data stored in the intermediate buffer 209, respectively;

FIGS. 8A, 8B, 8C and 8D are views for illustrating a seventh embodiment; and

FIGS. 9A, 9B, 9C and 9D are views for illustrating an eighth embodiment.

DETAILED DESCRIPTION OF THE PREFERRED EMBODIMENTS (First Embodiment)

Figure 1A:
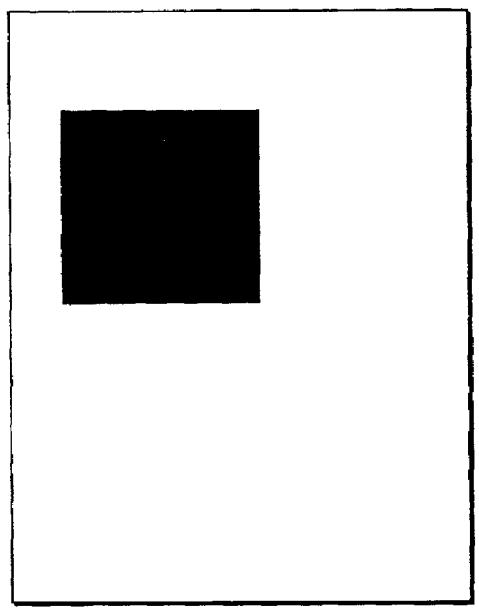
FIGS. 1A and 1B are views showing a conventional example.
Figure 1B:
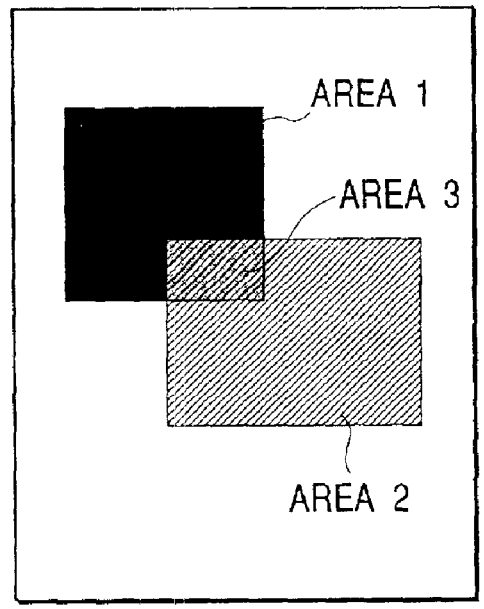
Figure 2:
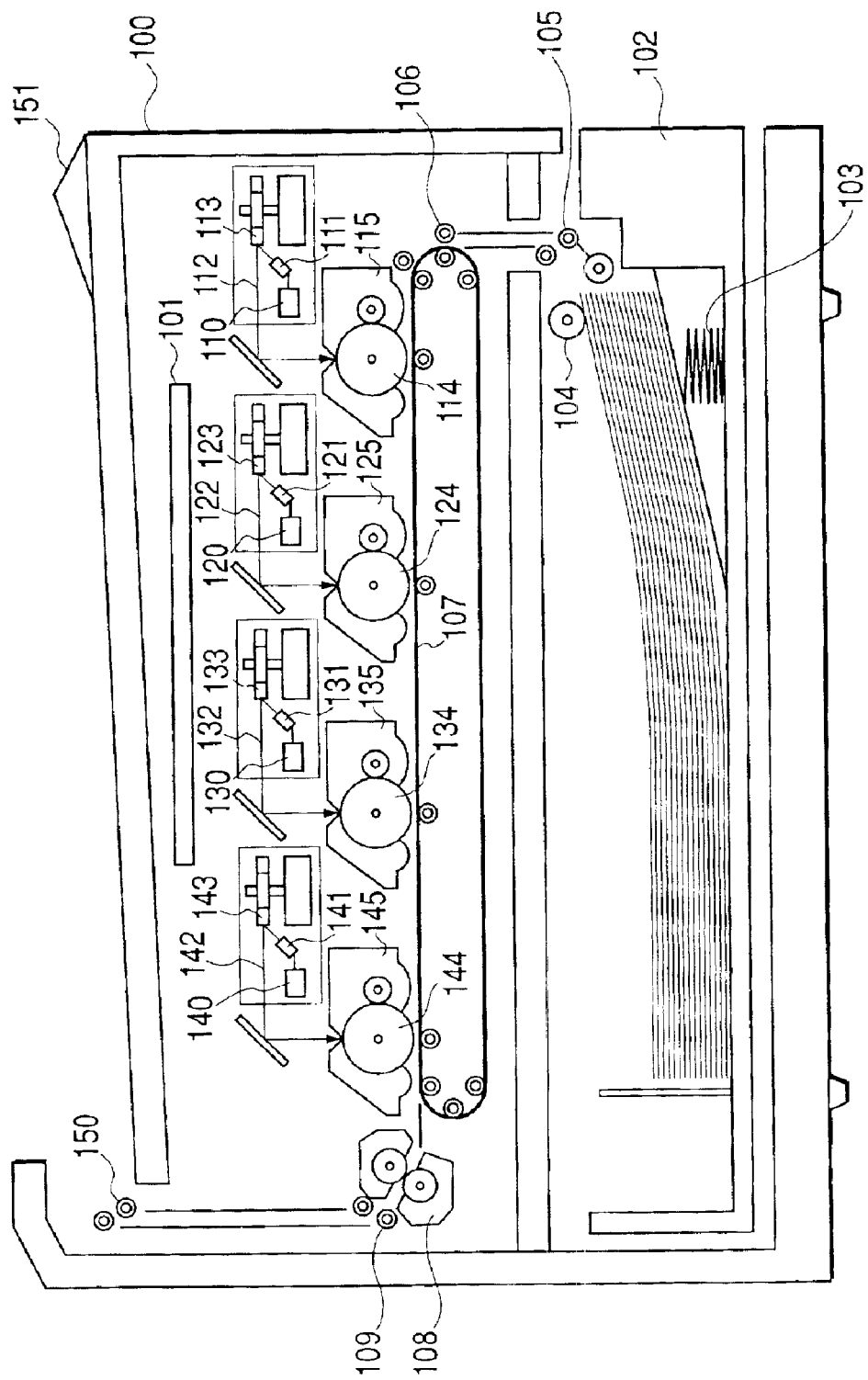
FIG. 2 is a sectional view showing internal configurations of a laser beam printer (LBP) of an embodiment.

Now embodiments of the present invention applied to a laser beam printer (hereinafter, abbreviated as LBP) will be described below in detail with reference to accompanying drawings. Prior to describing the configuration of an embodiment, a configuration of an LBP to which the embodiment is applied is explained with reference to FIG. 2. FIG. 2 is a sectional view showing internal configurations of the LBP of this embodiment.

In FIG. 2, 100 denotes a main body of the LBP, which creates corresponding character patterns, graphics or images in accordance with character printing instructions, graphics drawing instructions for various kinds of graphics, image drawing instructions, color specification instructions or the like provided by a host computer (shown as 201 in FIG. 3) connected to the external, and forms an image onto a recording sheet as a recording medium. 151 denotes an operation panel provided with an LED indicator, LCD indicator or the like indicating status of a switch for operation and a printer. 101 denotes a printer controlling unit which controls an entire LBP 100 and analyzes the character printing instructions or the like provided by the host computer.

The LBP in this embodiment converts color information of RGB into information of M (magenta), C (cyan), Y (yellow) and K (black) and performs image formation and development for each color in parallel, therefore, an image forming/developing mechanism for each of MCYK colors is provided. The printer controlling unit 101 generates a printing image for each of MCYK colors, converts the image into a video signal, and outputs the signal to a laser driver for each of MCYK colors.

A laser driver 110 for M (magenta) is a circuit for driving a semiconductor laser 111, which turns on and off a laser light 112 emitted by the semiconductor laser 111 in accordance with the input video signal. The laser light 112 is moved from left to right by a rotating polygonal mirror 113 for scanning an electrostatic drum 114. As a result, an electrostatic latent image having a pattern of characters or graphics is formed on the electrostatic drum 114. The latent image is developed by a developing unit (toner cartridge) 115 surrounding the electrostatic drum 114, and then transferred to the recording sheet.

For C (cyan), Y (yellow) and K (black), the image forming/developing mechanisms same as that for M (magenta) is provided: reference numerals 120, 121, 122, 123, 124 and 125 in the figure constitute the image forming/developing mechanism for C (cyan); 130, 131, 132, 133, 134 and 135 constitute the image forming/developing mechanism for Y (yellow); and 140, 141, 142, 143, 144 and 145 constitute the image forming/developing mechanism for K (black). Because functions of each of those image forming/developing mechanism are the same as that for M (magenta), explanation of the functions is omitted.

Cut sheets are used as the recording sheets. The cut sheets are stored in a sheet feeding cassette 102 attached to the LBP, and the height of the stack of sheets is maintained constant by a spring 103. The sheet is fed into the body of the LBP by a sheet feeding roller 104 and transport rollers 105 and 106, carried on a sheet transport belt 107 and passes through each of the image forming/developing mechanisms for MCYK. Toner (powdered ink) of each of MCYK colors transferred onto the recording sheet is fixed to the sheet by application of heat and pressure in a fuser 108, and then the recording sheet is transported to the top portion of the main body of the LBP by transport rollers 109 and 150.

Figure 3:
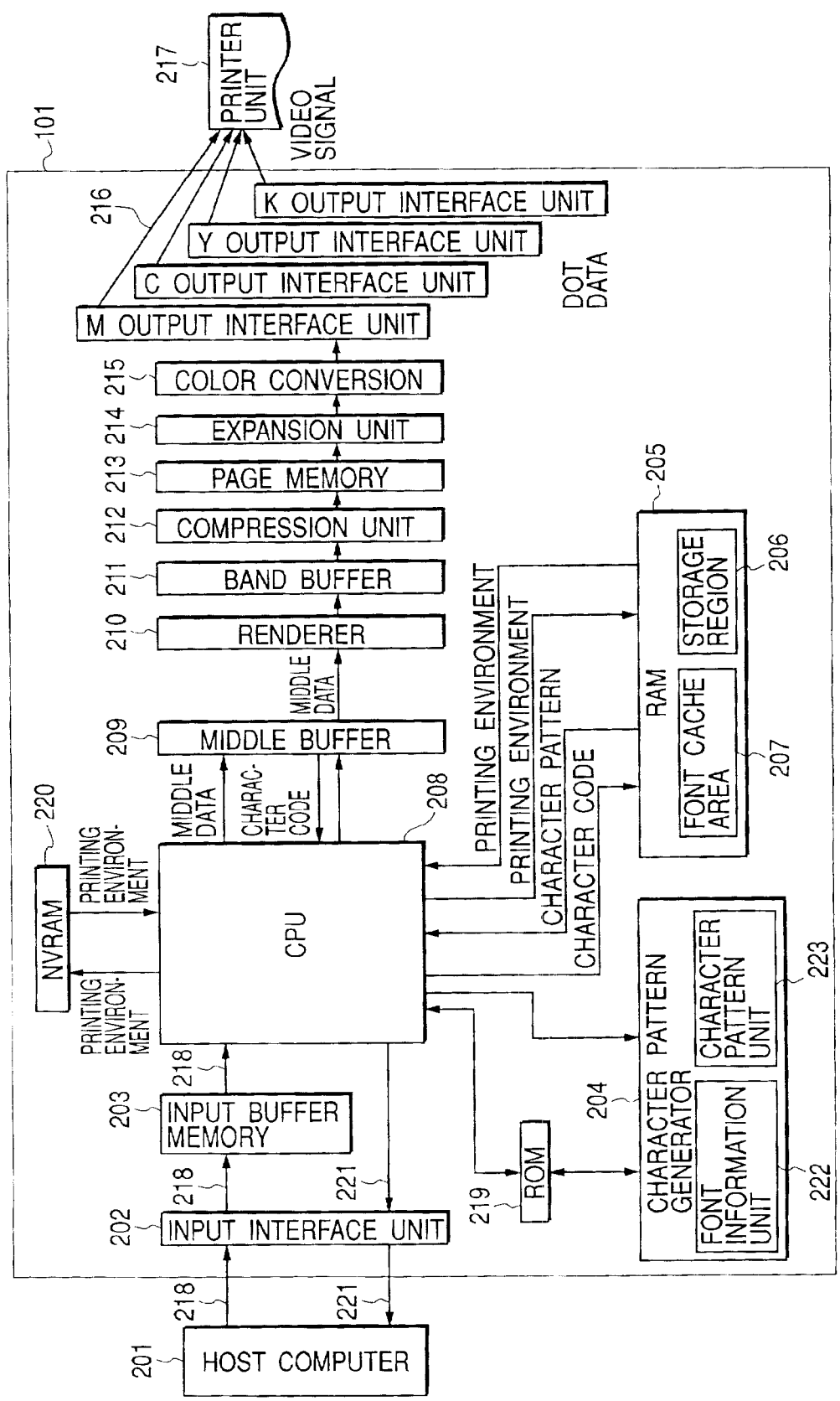
FIG. 3 is a block diagram illustrating a controlling configuration of a body of the LBP shown in FIG. 2.

FIG. 3 is a block diagram showing a schematic configuration of a controlling system 101 of the LBP shown in FIG. 2.

The controlling system 101 of the LBP controls the LBP so that data 218 including a drawing instruction for each of characters, graphics and images and color information and so forth transmitted from the host computer 201, a source of printing information, is input, and the printing of document information or the like is performed page by page. 202 denotes an input/output interface unit which inputs various kinds of information from the host computer 201, and 203 denotes an input buffer memory which temporarily stores the various kinds of information input through the input/output interface unit 202. 204 denotes a character pattern generator constituted by a font information unit 222 storing attributes of a character such as width or height and an address of an actual character pattern, a character pattern unit 223 storing the character pattern itself, and a readout controlling program for them.

The readout controlling program is included in a ROM 219 and has a code convert function for calculating an address of a character pattern corresponding to an input character code. 205 denotes a RAM including a font cache area 207 for storing character patterns output from the character pattern generator 204 and a storage region 206 for storing custom character fonts, form information, current printing environment and so on. By storing the pattern information, which is a character pattern once expanded, in the font cache area 207 as a font cache in this way, the expansion to a character pattern can be faster because decoding and pattern expansion are unnecessary when the characters same as those already printed are going to be printed.

208 denotes a CPU that controls the entire controlling system for the printer, and the entire apparatus is controlled by a controlling program of the CPU 208 stored in the ROM 219. 209 denotes an intermediate buffer that stores internal data groups generated based on the input data 218.

Reception of data for one page is completed, and under the control by the CPU 208 based on the program stored in the ROM 219, the data is converted into intermediate data that is more simple and stored in the intermediate buffer 209. The intermediate data is then subjected to rendering per several lines as a unit by a renderer 210, and output to a band buffer 211 as a printing image. The renderer 210 is capable of generating a drawing bitmap image constituted by a bitmap image of RGB colors each having 8 bits per pixel per several-line unit.

The band buffer 211 can store the RGB drawing bitmap image corresponding to at least 8 lines. The image output to the band buffer 211 is compressed to a scan-line unit by a compression unit 212 and stored in a page memory 213.

After rendering of the intermediate buffer data for one page is completed and the data is stored in the page memory 213, the data is read out per several-line unit by an expansion unit 214 to be expanded. The expanded data is then transmitted to a color conversion unit 215 where the bitmap image of RGB colors each having 8 bits per pixel is converted into a bitmap image of YMCK each having 4 bits per pixel. The converted data is transmitted to an output interface unit 216, converted into a video signal, and output to a printer unit 217. The printer unit 217 is a printing mechanism of a page printer that prints image information based on the video signal from the output interface unit 216.

Since the LBP in this embodiment, as described above with reference to FIG. 2, performs image formation and development for MCYK in parallel, the output interface unit 216 is constituted by four interface units, namely, M output interface unit, C output interface unit, Y output interface unit and K output interface unit. Each unit independently obtains dot data from the color conversion unit 215, converts it into the video signal, and outputs the signal to a corresponding laser driver among 110, 120, 130 and 140 on each plane.

220 depicts a nonvolatile memory composed of commonly used EEPROM or the like, which is hereinafter abbreviated as NVRAM (Non Volatile RAM). NVRAM 220 stores a panel setting value specified by the operation panel 151, and so on. 221 indicates data transmitted from the LBP to the host computer 201. The ROM 219 also includes a program for analyzing data input by the host computer 201, a program for generating the intermediate data, a controlling program for the main body of the printing mechanism 217, a color conversion table for converting the RGB color space into the MCYK color space, and so forth.

In this embodiment, a color laser printer is taken as an example of the printing apparatus, but the embodiment may be applied to other color printers such as a color ink jet printer and color thermal transfer printer. It has been described that the renderer 210 generates a bitmap image of RGB colors each having 8 bits per pixel. However, the bitmap image may be a YMCK bitmap image or gray bitmap image. The number of bits per pixel of each color can be an arbitrary value. In this case, the band buffer 211, the compression unit 212, the page memory 213 and the expansion unit 214 should be adaptable to the color space generated by the renderer 210 and the number of bits per pixel. The expanded data should allow the data generated by the renderer 210 to be converted into data of a color space and the number of bits per pixel adaptable to the output interface unit 216.

Figures 4A, 4B, 4C:
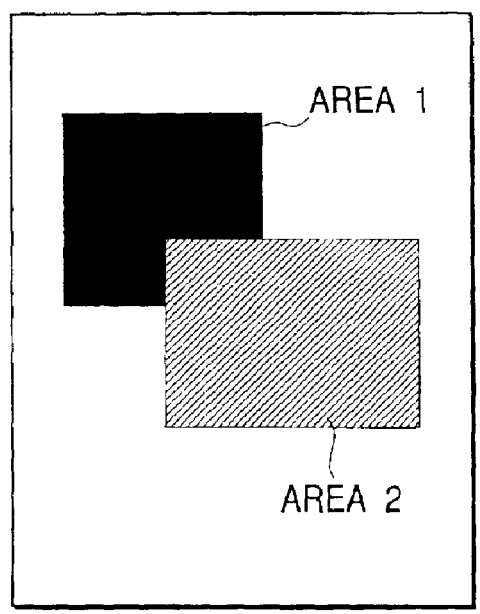
FIGS. 4A, 4B and 4C show a drawing command of the input data 218, intermediate data stored in the intermediate buffer 209 and a drawing bitmap image generated by the renderer 210, respectively.

An example of a process flow in this embodiment will be explained below. FIGS. 4A, 4B and 4C illustrate a drawing command of the input data 218, the intermediate data stored in the intermediate buffer 209, and the drawing bitmap image generated by the renderer 210, respectively.

An input command such as a character command, graphics command or image command is input from the host computer 201 (FIG. 4A). As a graphics command 1, a box with a value of RGB=(255, 0, 0) and a drawing logic of overwriting ROP=S are input, and as a graphics command 2, a box with a value of RGB=(255, 255, 0) and a drawing logic of overwriting ROP=S are input.

Then the input data is converted into the intermediate data and stored in the intermediate buffer 209 (FIG. 4B). Here, as Object 1, the following items are prepared:
 Attribute: type=graphics (box);
 Printing position: (X, Y);
 Width and height: (w, h);
 Color: RGB=(255, 0, 0); and
 Drawing logic: ROP=S (overwriting).
As Object 2, the following items are prepared:
 Attribute: type=graphics (box);
 Printing position: (X+a, Y+b);
 Width and height: (w', h');
 Color: RGB=(255, 255, 0); and
 Drawing logic: ROP=S (overwriting).

The renderer 210 executes drawing of the intermediate data, thereby generating the drawing bitmap image (FIG. 4C). The first bitmap image is a bitmap image of RGB colors each having 8 bits per pixel, a rectangle having a value of RGB=(255, 0, 0) is drawn in the area 1, and a rectangle having a value of RGB=(255, 255, 0) is drawn in the area 2. A region where nothing is drawn has a value of RGB=(255, 255, 255).

An example of a process flow in this embodiment in performing alpha blending will be explained below. FIGS. 5A, 5B, 5C and 5D illustrate a drawing command of the input data 218, the intermediate data stored in the intermediate buffer 209, the drawing bitmap image generated by the renderer 210, and a pattern stored in the intermediate buffer 209, respectively.

An input command such as a character command, graphics command or image command is input from the host computer 201 (FIG. 5A). As a graphics command 1, a box with a value of RGB=(255, 0, 0) and a drawing logic of overwriting ROP=S are input, and as a graphics command 2, a box with a value of RGB=(255, 255, 0) and a drawing logic of alpha blending specification α=128 are input. In the alpha blending specification, a single alpha blending specification may be provided to all input commands, or alternatively, a plurality of alpha blending specifications may be given to the input commands by providing alpha blending specification to each and every command.

The alpha blending that is originally expected is as follows:

Result$R$=(α/255)×$SrcR$+(1−(α/255))×$DestR$;

Result$G$=(α/255)×$SrcG$+(1−(α/255))×$DestG$; and

Result$B$=(α/255)×$SrcB$+(1−(α/255))×$DestB$, where ResultR (or G or B) is a value of the first bitmap image after drawing is executed, SrcR (or G or B) is a value of color of an input object, DestR (or G or B) is a value of the first bitmap image before drawing is executed, and α is an alpha blending value of the input object.

Then, under the control of the CPU 208 based on the program stored in the ROM 219, the input data is converted into the intermediate data and stored in the intermediate buffer 209 (FIG. 5B). Here, as Object 1, the following items are prepared:
 Attribute: type=graphics (box);
 Printing position: (X, Y);
 Width and height: (w, h);
 Color: RGB=(255, 0, 0); and
 Drawing logic: ROP=S (overwriting).
As Object 2, the following items are prepared:
 Attribute: type=graphics (box);
 Printing position: (X+a, Y+b);
 Width and height: (w', h');
 Color: RGB=(255, 255, 0);
 Pattern: width and height (w', h') pattern; and
 Drawing logic: ROP=DSPDxax.

FIG. 5D shows tile pattern data (area information) applied to Object 2. Because the alpha blending value is 128, the tile pattern becomes a binary bitmap with the width of 8 pixels and the height of 8 pixels, where white and black pixels are arranged so that the ratio of the white pixels to the black pixels (ratio of ON to OFF) is 50:50.

If the alpha blending value is 64, the ratio of the white pixel to the black pixel becomes 25:75.

The renderer 210 then executes drawing of the above-described intermediate data, thereby generating the drawing bitmap image (FIG. 5C). The first bitmap image is a bitmap image of RGB colors each having 8 bits per pixel, a rectangle having a value of RGB=(255, 0, 0) is drawn in the area 1, and a region where nothing is drawn has a value of RGB=(255, 255, 255).

The command ROP=DSPDxax performs a process such that, in a printing result, pixels corresponding to the white pixels in the tile pattern (area information) reflect a source (RGB=(255, 0, 0) in Object 1), and pixels corresponding to the black pixels in the tile pattern (area information) reflect a destination (RGB=(255, 255, 0) in Object 2). Consequently, in the area 2, 50% of all pixels have the value of RGB=(255, 255, 255) and remaining 50% of pixels have the value of RGB=(255, 255, 0). In the area 3, 50% of all pixels have the value of RGB=(255, 0, 0) and remaining 50% of pixels have the value of RGB=(255, 255, 0).

By replacing an alpha blending specification with area information (tile pattern data) corresponding to an alpha blending data and converting a drawing command into another drawing command corresponding to the area information as described so far, it is possible to execute the alpha blending drawing even if drawing means does not support the alpha blending drawing.

(Second Embodiment)

The second embodiment will be described below. FIGS. 6A, 6B, 6C and 6D illustrate a drawing command of the input data 218, the intermediate data stored in the intermediate buffer 209, the drawing bitmap image generated by the renderer 210, and dither data stored in the intermediate buffer 209, respectively.

An input command such as a character command, graphics command or image command is input from the host computer 201 (FIG. 6A). As a graphics command 1, a box with a value of RGB=(255, 0, 0) and a drawing logic of overwriting ROP=S are input. And as a graphics command 2, an image with a printing position (X+a, Y+b), width and height (w', h') and a modification matrix of image (matrix), all pixels having a value of RGB=(255, 255, 0) with 24 bits per pixel as image data, a drawing logic with a printing position of alpha mask (x, y), width and height (w', h') and a modification matrix of mask (matrix), and all pixels having a value of 128 with 8 bits per pixel as alpha mask data are input.

The alpha blending that is originally expected is as follows:

$$ResultR=(\alpha/255)\times SrcR+(1-(\alpha/255))\times DestR;$$

$$ResultG=(\alpha/255)\times SrcG+(1-(\alpha/255))\times DestG; \text{ and}$$

$$ResultB=(\alpha/255)\times SrcB+(1-(\alpha/255))\times DestB,$$

where ResultR (or G or B) is a value of the first bitmap image after drawing is executed, SrcR (or G or B) is a pixel value corresponding to a printing position of an input image, DestR (or G or B) is a value of the first bitmap image before drawing is executed, and α is a pixel value corresponding to a printing position of an input mask.

The input data is then converted into the intermediate data and stored in the intermediate buffer 209 (FIG. 6B). Here, as Object 1, the following items are prepared:
  Attribute: type=graphics (box);
  Printing position: (X, Y);
  Width and height: (w, h);
  Color: RGB=(255, 0, 0); and
  Drawing logic: ROP=S (overwriting).
As Object 2, the following items are prepared:
  Attribute: type=image;
  Printing position: (X+a, Y+b);
  Width and height: (w', h');
  Matrix: matrix; and
  Image data: all pixels having a value of RGB=(255, 255, 0).
As a pattern used for Object 2, the following items are prepared:
  Printing position: (X+a, Y+b);
  Width and height: (w', h');
  Matrix: matrix; and
  Pattern data: all pixels (multivalue bitmap image)=128.
As dither data for binarizing the pattern, the following items are prepared:
  Width and height: (w', h'); and
  Dither data image.
As a drawing logic for the pattern and destination, the following item is prepared:
  Drawing logic: ROP=DSPDxax.

FIG. 6D shows dither data applied to Object 2, which is a binarizing threshold table having a width of 8 bits and a height of 8 bits, where, in binarizing alpha mask data (multivalue bitmap image), white pixels and black pixels are arranged so that the ratio of the white pixels to the black pixels is proportional to the value of the alpha mask. The values in the threshold table are represented by hexadecimal numbering system. The dither table is used according to the following expression:

pattern=AlphaMask>DitherData:pattern=1 (white), pattern=0 (black) (ON or OFF corresponding to the alpha value)

where pattern is a binary bitmap pattern obtained from the alpha mask data and dither data, AlphaMask is an alpha mask data value (all pixels having a value of 128) corresponding to a pixel position in the first bitmap, and DitherData is a dither table value (FIG. 6D) corresponding to a pixel position in the first bitmap. That is, if the alpha mask data value of all pixels is 128, the ratio of the white pixels to the black pixels (the ratio of ON to OFF corresponding to the alpha value) is 50:50. If the alpha mask data value of all pixels is 64, the ratio of the white pixels to the black pixels (the ratio of ON to OFF corresponding to the alpha value) becomes 25:75.

The renderer 210 then executes drawing of the intermediate data, thereby generating the drawing bitmap image (FIG. 6C). The first bitmap image is a bitmap image of RGB colors each having 8 bits per pixel, a rectangle having a value of RGB=(255, 0, 0) is drawn in the area 1, and a region where nothing is drawn has a value of RGB=(255, 255, 255).

The command ROP=DSPDxax, in the area 3, performs a process such that pixels in a printing result corresponding to the white pixels in the pattern reflect a source (RGB=(255, 0, 0)), and pixels corresponding to the black pixels in the pattern reflect a destination (RGB=(255, 255, 0)). Consequently, in the area 2, 50% of all pixels have the value of RGB=(255, 255, 255) and remaining 50% of pixels have the value of RGB=(255, 255, 0). In the area 3, 50% of all pixels have the value of RGB=(255, 0, 0) and remaining 50% of pixels have the value of RGB=(255, 255, 0).

By replacing an alpha blending specification with area information corresponding to an alpha value and converting a drawing command into another drawing command corresponding to the area information as described so far, it is possible to execute the alpha blending drawing even if drawing means does not support the alpha blending drawing.

(Third Embodiment)

Figure 7:
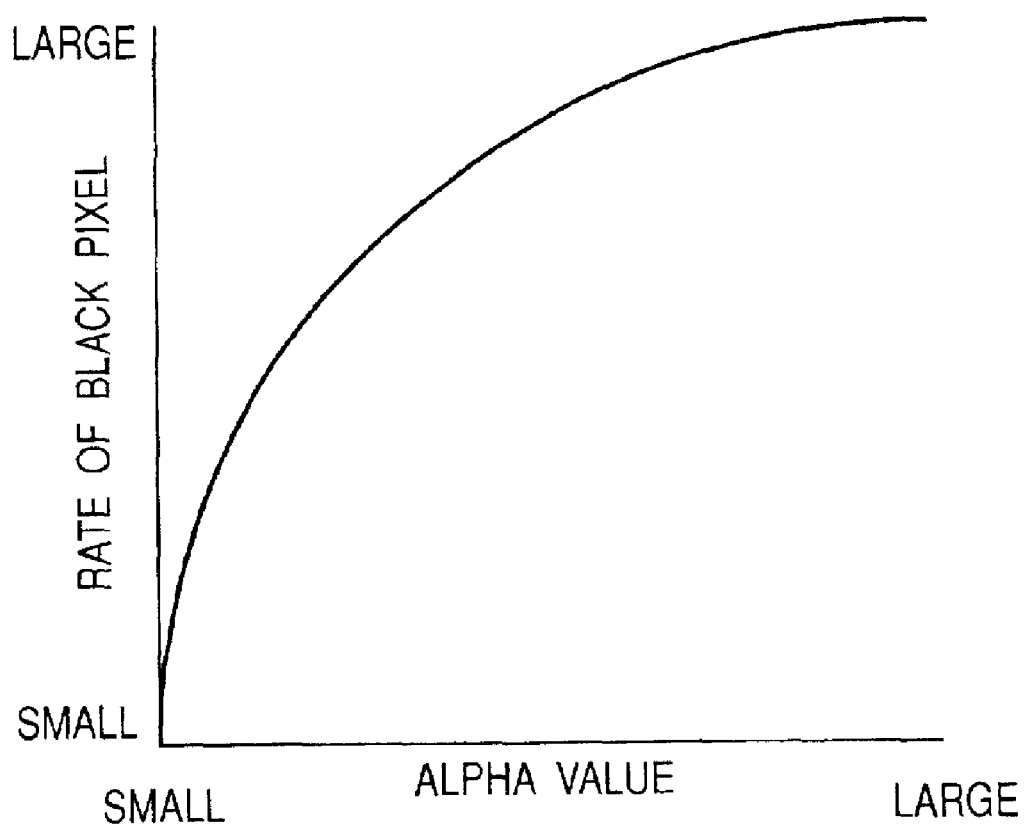
FIG. 7 is a graph showing the relation between an alpha value and a rate of black pixel in a pattern.

In the first and second embodiments, the ratio between the white pixels and black pixels is calculated in proportion to the alpha value. However, as shown in FIG. 7, the correlation between the alpha value and the rate of black pixels in the pattern need not be the proportional expression. In addition, desired alpha blending may be implemented by specifying the correlation between the alpha value and rate of black pixels from the host computer 201.

(Fourth Embodiment)

In the first embodiment, the correlation between the alpha value and the rate of the black pixels in the pattern may be changed per type of the object such as character, graphics and image. In this case, the CPU 208 may recognize the type of the input object, and according to the program in the ROM 219, the CPU 208 may increase the rate of black pixels if the input object is character or graphics. Thereby the outline of the character or graphics is preserved, thus making it easier to visually discriminate between the character and graphics.

(Fifth Embodiment)

In the first embodiment, the size of the pattern may be arbitrarily determined. In addition, possible pixel arrangements for the white and black pixels may be arbitrarily made.

(Sixth Embodiment)

In the second embodiment, the size of the pattern and possible pixel arrangements for the white and black pixels may be adjusted to avoid interference with a screen size and screen angle caused by a gray-scale conversion in converting a bitmap image of RGB colors each having 8 bits per pixel into a bitmap image of YMCK each having 4 bits per pixel by the color conversion unit 215. Specifically, according to the program stored in the ROM 219, the CPU 208 may differentiate the screen angle of the dither data from the gray-scale screen angle generated in the gray-scale conversion by the color conversion unit 215, for example, if the gray-scale screen angle is 90°, the dither data screen angle is adjusted to be 0°, thus making it possible to prevent the interference.

(Seventh Embodiment)

An example of a process flow in the seventh embodiment will be described below. FIGS. 8A, 8B, 8C and 8D illustrate a drawing command of the input data 218, intermediate data stored in the intermediate buffer 209, a drawing bitmap image generated by the renderer 210, and a clip object stored in the intermediate buffer 209, respectively.

An input command such as a character command, graphics command or image command is input from the host computer 201 (FIG. 8A). As a graphics command 1, a box with a value of RGB=(255, 0, 0) and a drawing logic of overwriting ROP=S are input, and as a graphics command 2, a box with a value of RGB=(255, 255, 0) and a drawing logic of alpha blending α=128 are input.

The alpha blending that is originally expected is as follows:

$$Result R=(\alpha/255) \times Src R+(1-(\alpha/255)) \times Dest R;$$

$$Result G=(\alpha/255) \times Src G+(1-(\alpha/255)) \times Dest G; \text{ and}$$

$$Result B=(\alpha/255) \times Src B+(1-(\alpha/255)) \times Dest B,$$

where ResultR is a value of the first bitmap image after drawing is executed, SrcR is a value of the color of an input object, DestR is a value of the first bitmap image before drawing is executed, and α is an alpha blending value of an input object.

The input data is then converted into the intermediate data and stored in the intermediate buffer 209 (FIG. 8B). Here, as Object 1, the following items are prepared:
- Attribute: type=graphics (box);
- Printing position: (X, Y);
- Width and height: (w, h);
- Color: RGB=(255, 0, 0); and
- Drawing logic: ROP=S (overwriting).

As Object 2, the following items are prepared:
- Attribute: type=graphics (box);
- Printing position: (X+a, Y+b);
- Width and height: (w', h');
- Color: RGB=(255, 255, 0);
- Clip: clip object; and
- Drawing logic: ROP=S (overwriting).

FIG. 8D shows clip object data applied to Object 2. Because the alpha blending value is 128, it is represented as a set constituted by a plurality of rectangles arranged so that 50% of the rectangular region of Object 2 may be effective pixels. If the alpha blending value is 64, the set constituted by a plurality of rectangles is formed so that 25% of the rectangular region of Object 2 may be the effective pixels.

The renderer 210 then executes drawing of the intermediate data, thereby generating the drawing bitmap image (FIG. 8C). The first bitmap image is a bitmap image of RGB colors each having 8 bits per pixel, a rectangle having a value of RGB=(255, 0, 0) is drawn in the area 1, and a region where nothing is drawn has a value of RGB=(255, 255, 255). The command clip executes drawing only in a region enclosed by the clip object. Consequently, in the area 2, 50% of all pixels have the value of RGB=(255, 255, 255) and remaining 50% of pixels have the value of RGB=(255, 255, 0). In the area 3, 50% of all pixels have the value of RGB=(255, 0, 0) and remaining 50% of pixels have the value of RGB=(255, 255, 0).

By replacing an alpha blending specification with area information corresponding to an alpha value and converting a drawing command into another drawing command corresponding to the area information as described so far, it is possible to execute the alpha blending drawing even if drawing means does not support the alpha blending drawing.

(Eighth Embodiment)

An example of a process flow in the eighth embodiment will be described below.

FIGS. 9A, 9B, 9C and 9D illustrate a drawing command of the input data 218, intermediate data stored in the intermediate buffer 209, a drawing bitmap image generated by the renderer 210, and rectangles of Object 2 and subsequent thereto stored in the intermediate buffer 209, respectively.

An input command such as a character command, graphics command or image command is input from the host computer 201 (FIG. 9A). As a graphics command 1, a box with a value of RGB=(255, 0, 0) and a drawing logic of overwriting ROP=S are input, and as a graphics command 2, a box with a value of RGB=(255, 255, 0) and a drawing logic of alpha blending α=128 are input.

The alpha blending that is originally expected is as follows:

$$Result R=(\alpha/255) \times Src R+(1-(\alpha/255)) \times Dest R;$$

$$Result G=(\alpha/255) \times Src G+(1-(\alpha/255)) \times Dest G; \text{ and}$$

$$Result B=(\alpha/255) \times Src B+(1-(\alpha/255)) \times Dest B,$$

where ResultR (or G or B) is a value of the first bitmap image after drawing is executed, SrcR (or G or B) is a value of color of an input object, DestR (or G or B) is a value of the first bitmap image before drawing is executed, and α is an alpha blending value of an input object.

The input data is then converted into the intermediate data and stored in the intermediate buffer 209 (FIG. 9B). Here, as Object 1, the following items are prepared:
- Attribute: type=graphics (box);
- Printing position: (X, Y);
- Width and height: (w, h);
- Color: RGB=(255, 0, 0); and
- Drawing logic: ROP=S (overwriting).

As Object 2, the following items are prepared:
- Attribute: type=graphics (box);
- Printing position: (X+a, Y+b);
- Width and height: (w', h');
- Color: RGB=(255, 255, 0); and
- Drawing logic: ROP=S (overwriting).

As Object 3, the following items are prepared:
- Attribute: type=graphics (box);
- Printing position: (X+a, Y+c);
- Width and height: (w', h');
- Color: RGB=(255, 255, 0); and
- Drawing logic: ROP=S (overwriting).

As Object 4, the following items are prepared:
- Attribute: type=graphics (box);

Printing position: (X+a, Y+d);
Width and height: (w', h');
Color: RGB=(255, 255, 0); and
Drawing logic: ROP=S (overwriting).

FIG. 9D shows rectangular object data applied to Object 2 and those subsequent thereto. Because the alpha blending value is 128, the data applied to Object 2 or later is represented as a set constituted by a plurality of rectangles arranged so that 50% of the rectangular region may be effective pixels. If the alpha blending value is 64, the set constituted by a plurality of rectangles is formed for Object 2 and those subsequent thereto so that 25% of the rectangular region may be the effective pixels.

The renderer 210 then executes drawing of the intermediate data, thereby generating the drawing bitmap image (FIG. 9C). The first bitmap image is a bitmap image of RGB colors each having 8 bits per pixel. A rectangle having a value of RGB=(255, 0, 0) is drawn in the area 1, and a region where nothing is drawn has a value of RGB=(255, 255, 255).

Since the rectangles are arranged as shown in FIG. 9D, in the area 2, 50% of all pixels have the value of RGB=(255, 255, 255) and remaining 50% of pixels have the value of RGB=(255, 255, 0). In the area 3, 50% of all pixels have the value of RGB=(255, 0, 0) and remaining 50% of pixels have the value of RGB=(255, 255, 0).

By replacing an alpha blending specification with area information corresponding to an alpha value and converting a drawing command into another drawing command corresponding to the area information as described so far, it is possible to execute the alpha blending drawing even if drawing means does not support the alpha blending drawing. In addition, even if the bit depth of the first bitmap image is less than that of the alpha blending value, the alpha blending drawing is available by the use of area information.

(Other Embodiments)

A processing method, that stores in a storage medium a program for causing the configurations of the above-described embodiments to operate so as to implement the functions of the above-described embodiments, reads out the program from the storage medium as code and executes the program on a computer, falls under a category of the above-described embodiments. The storage medium storing the above-described program is also included in the above-described embodiments.

As the storage medium, for example, a floppy disk, hard disk, optical disk, magneto-optical disk, CD-ROM, magnetic tape, nonvolatile memory card or ROM may be used.

Not only the processing method that executes processing by a program stored in the storage medium alone, but also a method for executing the operations of the above-described embodiments on an operating system in coordination with functions of other software applications or expansion boards is also included in the category of the above-described embodiments.

What is claimed is:

1. A print controller and drawing controller having drawing means for executing drawing according to an input drawing command to a first bitmap image and drawing process specifying means for performing alpha blending specification (transparency degree specification) in executing drawing according to an input object as a drawing command to the first bitmap image, said print controller and drawing controller comprising:

alpha value replacing means for replacing the alpha blending specification with area information corresponding to an alpha value; and drawing command converting means for converting the drawing command into another drawing command for performing a process corresponding to the area information.

2. The print controller and drawing controller according to claim 1, wherein said drawing process specifying means comprises means for specifying a single alpha value for all the input commands as the alpha blending specification in executing drawing according to the input object to a bitmap image.

3. The print controller and drawing controller according to claim 1, wherein said drawing process specifying means comprises means for specifying a plurality of alpha values for the input commands as the alpha blending specification in executing drawing according to the input object to a bitmap image.

4. The print controller and drawing controller according to claim 1, wherein said alpha value replacing means comprises means for converting the alpha blending specification into a bitmap having a ratio of ON to OFF corresponding to the alpha value.

5. The print controller and drawing controller according to claim 1, wherein said alpha value replacing means comprises means for converting a multivalue bitmap image that specifies a plurality of alpha values into a binary bitmap having a ratio of ON to OFF corresponding to the alpha value.

6. The print controller and drawing controller according to claim 4 or 5, wherein said alpha value replacing means comprises means for changing the ratio of ON to OFF in converting the alpha blending specification into the ratio of ON to OFF corresponding to the alpha value depending upon an attribute of the input drawing command such as a character, graphics or image.

7. The print controller and drawing controller according to claim 4 or 5, wherein said alpha value replacing means comprises means for adjusting an arrangement of ON and OFF in converting the alpha blending specification into the ratio of ON to OFF corresponding to the alpha value so as to result in a screen angle and/or the number of screen lines which does not cause moiré patterns with a screen in gray-scale conversion of the first bitmap image.

8. The print controller and drawing controller according to claim 1, wherein said drawing command converting means comprises means for converting a combination of the input object of the input drawing command and the alpha blending specification into a combination of the input object, a bitmap image generated by said alpha value replacing means and drawing logic specification.

9. The print controller and drawing controller according to claim 8, wherein, in the combination of the input object, the bitmap image generated by said alpha value replacing means and the drawing logic specification, said drawing command converting means comprises means for executing drawing according to the input object at a position corresponding to a first condition of the binary bit in the bitmap image generated by said alpha value replacing means, and converting means transmitting through the first bitmap image at a position corresponding to a second condition.

10. The print controller and drawing controller according to claim 1, wherein said alpha value replacing means comprises means for specifying a clipping region having an effective area corresponding to the alpha value, and said drawing command converting means comprises means for overwriting the first bitmap image with the input object of the input drawing command by using the clipping region generated by said clipping region specifying means.

11. The print controller and drawing controller according to claim 1, wherein said alpha value replacing means comprises object converting means for converting the input object into a plurality of objects of a size having an effective area corresponding to the alpha value, and said drawing command converting means comprises means for overwriting the first bitmap image with the objects generated by said object converting means.

12. A data processing method for a print controller and image controller, which include a drawing step of executing drawing according to an input drawing command to a first bitmap image and a drawing process specifying step of performing alpha blending specification (transparency degree specification) in executing drawing according to an input object as a drawing command to the first bitmap image, the method comprising:

an alpha value replacing step of replacing the alpha blending specification with area information corresponding to an alpha value; and a drawing command converting step of converting the drawing command into another drawing command for performing a process corresponding to the area information.

13. A storage medium storing a program readable by a computer for executing drawing according to an input drawing command to a first bitmap image and performing alpha blending specification (transparency degree specification) in executing drawing according to an input object as a drawing command to the first bitmap image, the program comprising the steps of:

replacing the alpha blending specification with area information corresponding to an alpha value; and converting the drawing command into another drawing command for executing a process corresponding to the area information.

* * * * *

UNITED STATES PATENT AND TRADEMARK OFFICE
CERTIFICATE OF CORRECTION

PATENT NO. : 6,989,909 B2 Page 1 of 1
APPLICATION NO. : 09/885054
DATED : January 24, 2006
INVENTOR(S) : Joji Oki It is certified that error appears in the above-identified patent and that said Letters Patent is hereby corrected as shown below:

COLUMN 3:
Line 41, "mechanism" should read -- mechanisms --.

COLUMN 13:
Line 2, "include" should read -- includes --.

Signed and Sealed this

Nineteenth Day of December, 2006

JON W. DUDAS
*Director of the United States Patent and Trademark Office*